July 18, 1967 M. H. KAUFMAN 3,331,626
FOOD HOLDER
Filed Aug. 23, 1965

INVENTOR.
MICO H. KAUFMAN
BY Robert K. Churchill
ATTORNEY 3,331,626
FOOD HOLDER
Mico H. Kaufman, 23 Marion Drive,
North Tewksbury, Mass. 01876
Filed Aug. 23, 1965, Ser. No. 481,702
3 Claims. (Cl. 294—16)

This invention relates to a food holder and more particularly to an expendable holder for an article of food to be eaten while held in the hand.

The invention has for an object to provide a novel and improved holder of the character specified which is simple in structure, efficient in use, and which may be economically manufactured.

In the drawings illustrating the preferred embodiment of the invention:

In general, the present invention contemplates an expendable holder for an article of food to be eaten while held in the hand and finds particular use for holding food products, such as doughnuts, frosted cake, articles of pastry and the like, whereby to prevent soiling of the hands during handling of such food products. The present holder may be economically produced of flexible paper, thin cardboard, plastic material or the like, folded to provide wing portions or finger grips. In use the holder is wrapped about one edge of the article of food to flex the holder about the sides of the article which action disposes the finger grips parallel to the sides of the article to protect the hand from being soiled while the article of food is being eaten. Conversely, if the hands are soiled, the holder prevents soiling of the article of food for sanitation purposes. In practice, the holder is made in flat form for convenience of storage and shipment. In a modified form of the invention, the finger grips may be provided with depressed portions which afford better gripping engagement with the food when pressed thereagainst.

Figure 1:
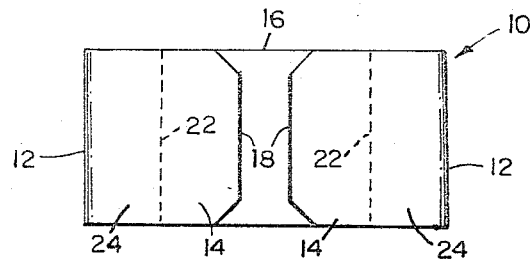
FIG. 1 is a plan view of a holder embodying the present invention.
Figure 2:
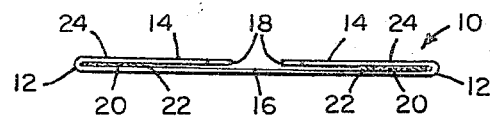
FIG. 2 is a side elevation of the same.

Referring now to the drawings, 10 represents the present food holder which comprises a strip or length of flexible paper, plastic, or the like, having its ends folded inwardly upon itself along fold lines 12 to provide wing or finger portions 14 and an intermediate connecting portion 16. The inner ends 18 of the wing portions 14 are spaced apart, as shown, and the wing portions are partially adhesively secured to the connecting portion 16 by adhesive 20 extending from the outer ends of the wings, coinciding with the fold lines 12, to a line 22 disposed at a point intermediate the length of the wings, preferably at a point about half the length of the wings, the remainder or inner portions of the wings being free of adhesive. The adhesively secured portions thus provide two-ply sections indicated at 24. The article thus produced is in flat form, as shown in FIG. 2, for convenience in storage and shipping.

Figure 3:
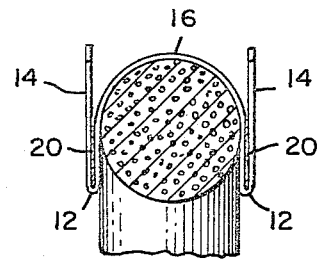
FIG. 3 is a side elevation of the holder wrapped about the edge and sides of an article of food, such as a doughnut.
Figure 6:
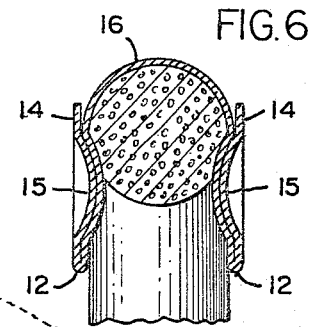
FIG. 6 is a view of the modified holder wrapped about a doughnut.
Figure 4:
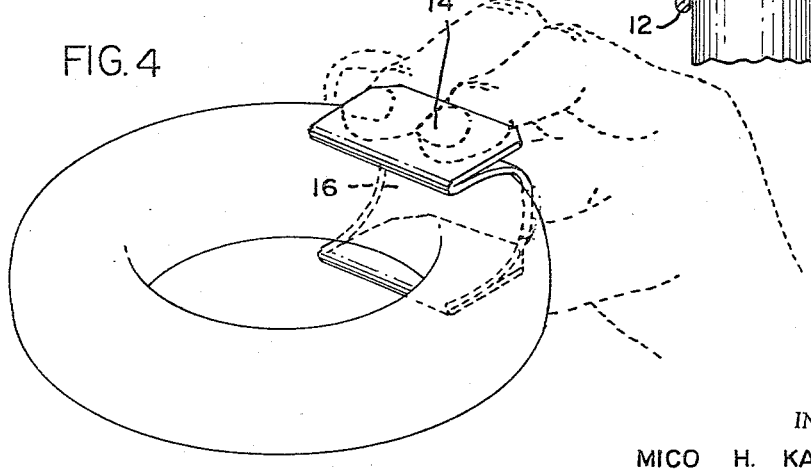
FIG. 4 is a perspective view of the holder shown as applied to a doughnut.

In use, the intermediate or single-ply portion 16 is merely pressed against the edge of the article of food, herein shown as a doughnut, and the end of the holder flexed about the adjacent sides of the article whereupon the wing or finger portions 14 will assume a position parallel to the opposite sides of the article as shown in FIG. 3. The wings are gripped between the fingers and thumb as shown in FIG. 4. The holder may be made in any convenient proportions in accordance with the use to which it is put. In practice, the wing portions 14 may be printed with any suitable design or may contain advertising material.

Figure 5:
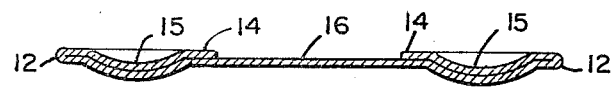
FIG. 5 is a side elevation of a modified form of the holder.

As illustrated in FIGS. 4 and 5, in a modified form of the invention, the holder may be similar in form to that shown in FIGS. 1 to 4 except that the wing portions 14 and the adjacent underlying portions of the strip comprising the two-ply sections 24 may be provided with depressed areas or dimples 15. In this embodiment of the invention the adhesive 20 may be eliminated. In use, when the holder is pressed about the article of food to be held, the depressed portions 15 will penetrate the food, thus providing an efficient gripping area.

From the above description, it will be seen that the present holder for an article of food to be held in the hand when eaten provides a simple and efficient one-piece expendable or "throw-away" holder which may be economically manufactured.

While the preferred embodiment of the invention has been herein illustrated and described, it will be understood that the invention may be embodied in other forms within the scope of the following claims.

Having thus described the invention, what is claimed is:

1. An expendable holder for an article of food held in the hand comprising a strip of flexible sheet material having inwardly folded end portions providing finger grips adhesively secured to the strip in an area extending from the fold lines to a point about one half the length of the finger grips, the remaining portions of the finger grips being free of adhesive, said strip adapted to be flexed about the edge and adjacent sides of the article to cause the finger grips to assume a position parallel to the sides of the article.

2. An expendable holder as defined in claim 1 wherein the inwardly folded finger grips and the adjacent underlying portions of the strip are provided with dimples arranged to penetrate the food when the holder is flexed thereabout.

3. A holder for an article of food held in the hand comprising a strip of flexible sheet material having inwardly folded wings at each end providing finger grips, said wings secured to the underlying portion of the strip providing a two-ply gripping structure, said strip adapted to be flexed about the edge and sides of the article causing the finger grips to assume a position parallel to the sides of the article and with the two-ply gripping structure disposed between the food and the fingers of the user, said inwardly folded wings and the adjacent underlying portions of the strip being provided with depressed portions to provide efficient gripping areas arranged to penetrate the food when the holder is applied and gripped with the fingers.

References Cited

UNITED STATES PATENTS

| 580,148 | 4/1897 | Staples | 294—25 X |
| 2,730,397 | 1/1956 | Hodska | 294—25 |

FOREIGN PATENTS

| 370,297 | 12/1906 | France. |
| 826,630 | 1/1952 | Germany. |
| 837,458 | 4/1952 | Germany. |

GERALD M. FORLENZA, *Primary Examiner.*

HUGO O. SCHULZ, *Examiner.*

G. F. ABRAHAM, *Assistant Examiner.*